Patented June 17, 1952

2,600,861

UNITED STATES PATENT OFFICE 2,600,861

MATURING COTTON

Kenneth L. Englund, Los Altos, Calif., assignor to Stauffer Chemical Company, a corporation of California No Drawing. Application December 28, 1949, Serial No. 135,527

2 Claims. (Cl. 71—2.7)

This invention relates to a procedure and compositions for treating cotton plants to cause the shedding of leaves and uniform opening of the bolls, thus facilitating the harvesting of the crop. While various materials are in general use for this purpose and many others have been proposed with varying results, none is considered satisfactory under the variety of climatic conditions encountered.

A substance which can duplicate the effect of a light frost on a cotton plant is commonly spoken of as a cotton maturing agent. Its effect is the same as a light frost in causing the formation of abscission layers of cells across the petiole bases of the leaves of cotton plants with the result that a premature leaf drop occurs. This also disrupts the metabolic functions of the plant and causes the bolls to open rapidly and uniformly.

On cotton which is not aided by artificial chemical maturing, the bolls on the lower branches open first while the opening of the mature bolls on the upper branches continues over a period of as long as two months from the time when picking of the lower bolls is desirable. The majority of leaves also remain attached to the plant and cause green stains on the cotton with a subsequent lowering of grade when mechanical cotton pickers are employed. Without the aid of chemical maturing agents, it follows that hand picking must be employed and as many as three pickings in the same field may be necessary if undesirable weathering of the cotton in early opening bolls is to be avoided and a maximum yield of high grade product obtained.

I have discovered that the foliage of cotton plants can be treated with a thio carbonic acid derivative to bring about the rapid maturing of the plants whereby the leaves are shed and the bolls open uniformly to permit the gathering of the entire crop in one picking operation and this with mechanical harvesting devices. When the leaves are shed, the plant assumes a more nearly vertical position upon losing the encumbering weight of leaves and a mechanical cotton picker can be used to advantage and without lowering the grade, something which cannot be avoided when green leaves are present on the plant.

The derivatives of a thio carbonic acid contemplated by this invention are, in general, extremely phytotoxic and when used in proper concentrations, even within rather wide limits, on cotton plants, tend to enter the leaf with subsequent tissue damager over the whole leaf area, thus terminating the translocation of plant nutrients for further growth of the plant and making these available for maturing of the remaining plant. The ability of a chemical to disrupt the normal functions of plant auxins and create a condition in which the auxins cause an abscission layer of cells to form with subsequent leaf drop is not too well understood by plant physiologists; this quality is not inherent in all chemicals that are phytotoxic. The compounds contemplated by this invention are unique in being both phytotoxic to cotton leaves and in causing the formation of an abscission layer of cells. A condition where the leaves are killed without the formation of an abscission layer is not desirable as the withered and brittle leaves become intermixed with the cotton during the harvesting operation; the dry leaves also shield the sun's rays from penetrating deep into a rank growth of cotton and thus prevent uniform opening of bolls.

To practice the invention one can use a dry dust formulation or a water spray containing the thio carbonic acid derivative. In general, it is advisable to use a dry dust applied by an airplane as this method insures a more even deposit on all leaf surfaces than is possible by a liquid spray, thus causing the shedding of base leaves as well as upper leaves in rank cotton growths.

The time of application of the cotton maturing agents of this invention is important. The compound should be applied immediately after the crop has been made, by which is meant at that period when the vegetative growth of the plant has slowed down and the majority of the bolls are fully developed but not yet open. At this time, flowers, squares and immature bolls do not normally develop to produce mature bolls and injury to these is of no commercial significance.

Accumulated evidence over a period of years with various commercially employed cotton maturing agents has shown a direct correlation between maturing activity in relation to either the amount of morning dew or the amount of soil moisture, or both. To a limited extent, the materials used in the past could be made more effective under adverse climatic or soil moisture conditions by an increase in the total amount applied to mature cotton. The materials of this invention, being very hygroscopic, take up atmospheric moisture in areas lacking in morning dew and react with leaf tissue. A dry dust of this invention can thus be used under semi-arid conditions and which preclude the use of many materials now used in non-arid areas; dust formulations are generally preferred over liquid sprays due to the greatly increased coverage obtained.

The materials which are useful in accordance with this invention in the maturing and harvesting of cotton are, broadly, the sulfur analogs of carbonic acid and which are known as thiocarbonic acids, e. g. thiol carbonic acid, thion carbonic acid, the two dithiol carbonic acids, thion thiol carbonic acid and trithio carbonic acid. These acids are unstable but their salts, esters and other derivatives are well-known. Of these, those most readily available at present and at a price enabling them to be employed economically to advantage are the derivatives of the thion thiol carbonic acid; these are known as xanthates and have the structural formula:

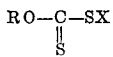

where R is usually an alkyl or an aryl group and X is a metal or equivalent substituent such as the ammonium radical; X can be sodium, potassium, calcium, magnesium, barium, iron, copper, mercury, lithium, zinc and lead, but those xanthates which are readily water soluble are preferred for they hydrolyze more readily on the plant. The xanthates are usually manufactured by forming an alcoholate of the desired metal and reacting this with carbon bisulfide. The usual alcohols employed for the presently available xanthates are generally monohydric, aliphatic, unsubstituted saturated alcohols such as methyl, ethyl, isopropyl, propyl, butyl, secondary butyl, tertiary butyl, and the various amyl alcohols, but other aliphatic alcohols and aryl alcohols such as phenol and the alcohol-like cyclic and heterocyclic compounds of Patents 1,813,342; 1,823,316; 1,833,464; 1,874,564 and 1,969,269 can be utilized to provide xanthates. Xanthates of some of the aforementioned alcohols and their preparation, and other thio carbonic acid derivatives are disclosed in Patents 1,491,021; 1,525,211; 1,554,216; 1,554,220; 1,634,924; 1,810,552; 1,903,140; 1,970,508; 2,037,437; 2,101,647; 2,106,558; 2,112,362; and 2,162,495.

The xanthate or other phytotoxic substances need not be isolated as such nor dried and one can use a crude liquid reaction mixture.

Various manufacturing processes are available for producing these phytotoxic substance compounds and one can employ the procedures of Patents Re. 16,474; 1,591,723; 1,594,858; 1,636,229; 1,701,264; 1,704,249; 1,753,787; 1,837,852; 1,872,452; 1,872,821; 2,024,923; 2,024,924 and 2,024,925, as well as the specific compounds which can be made in accordance therewith, particularly those xanthates which result from following the disclosure of Patent 2,024,925.

As the preferred materials, the alkali metal xanthates of the aforementioned aliphatic alcohols are desired for these are useful dry, relatively stable solids and are available commercially. One can use xanthates such as sodium ethyl xanthate, sodium propyl xanthate, sodium butyl xanthate, sodium amyl xanthate, sodium hexyl xanthate, sodium isopropyl xanthate, sodium secondary butyl xanthate, sodium tertiary butyl xanthate and the sodium xanthates of the various mixed amyl alcohols; the potassium xanthates can be used as can those of other presently disclosed metals, but these are usually more expensive than the corresponding sodium compounds.

The formula:

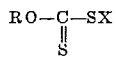

permits of other modification, as is disclosed in Patent 1,943,758, e. g., X can be the same as R or any one of the groups which can be utilized for R, or R can be, in turn, another xanthic radical so that the compound is a disulfide of the formula:

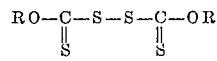

as is more particularly disclosed in Patents 1,674,122; 1,711,087; 1,735,701; 1,819,112; 1,902,317; 1,943,758 and 2,120,285. Suitable phytotoxic substances include the xanthic acid esters of Patent 1,684,536, the anhydrides of Patent 1,816,145 and the various derivatives of Patents 1,652,099 and 1,943,758.

The materials of this invention can be further adapted for use under arid conditions where heretofore no other materials used in the past have been successful by including an anhydrous, solid acid or acid salt such as citric or tartaric acid, sodium acid sulfate and the like, preferably one which is not hygroscopic since this property provides packaging difficulties. Only a very small amount of atmospheric humidity is necessary for reaction between the acid and the xanthate to form dithio carbonic acid. The dithio carbonic acid thus formed is extremely reactive, penetrating the leaf tissue and causing the desired maturing activity. Also, the dust layer on the cotton lint produces dithio carbonic acid and this, being relatively unstable, eliminates the contamination of the cotton fiber, an objection heretofore to using many chemical maturing agents.

Suitable dust mixtures include from 10% to 60% by weight of a dithio carbonic acid derivative such as sodium ethyl xanthate in a finely divided carrier such as volcanic ash, bentonite, anhydrite or calcined frianite. For arid areas and where it is desired to eliminate as much contamination as possible from the cotton fiber, a suitable mixture can include from 10% to 20% by weight of solid anhydrous tartaric acid or other solid anhydrous acid or acid salt, 30% to 50% by weight of sodium ethyl xanthate and the whole in a finely divided anhydrous carrier such as calcined frianite or anhydrite; the preferred ratio is one part of acid, e. g. tartaric, to three parts of the xanthate, e. g. sodium ethyl xanthate. Preparation of the dust is conveniently accomplished by grinding together the carrier and xanthate, or the carrier, xanthate and anhydrous acid, packaging in a moisture-proof container.

In the preparation of a spray, one can dissolve from one-half pound to two pounds of the xanthate in one gallon of water. For water insoluble derivatives, one can conveniently prepare an emulsifiable concentrate and disperse the amount necessary to secure from one-half pound to two pounds of the dithio carbonic acid derivative in one gallon of water. It may be desirable to incorporate wetting agents in a water solution containing dithio carbonic acid derivatives such as sodium ethyl xanthate. Commercial wetting agents such as Oronite D-40 are compatible with xanthic acid derivatives and tend to spread the spray droplets over a larger area on the leaf surface.

The dust compositions are generally applied at from 15 to 40 pounds per acre, usually about 30 pounds per acre, and the sprays at from 5 to 20 gallons per acre, usually about 10 gallons per acre. The exact concentration of active ingredient employed in the treating composition and the amount of the latter applied vary with the state of development of the cotton, the available soil moisture and the temperature. Similarly, when treating less mature stands of cotton or plants of medium development, reduced amounts of the spray or dust mixtures may be employed. Since the thio-carbonic acid derivatives decompose readily in the soil, a residue problem is not presented if, perchance, one should use an excess over that required for maturing of the cotton; further, the continued use of these substances in the same area does not provide a soil residual problem.

The density of the stand determines to a considerable degree the preferred method of application. In general, dusting operations have been found somewhat more satisfactory than spraying. While any suitable means may be employed for applying the dust mixtures, airplane dusting has given satisfactory results when operating on large acreages. However, hand or machine dusters are suitable when the condition of the cotton field permits their use without excessive mechanical injury to the crop. Sprays may be applied either from a plane or with the more conventional tank and boom spray rig.

The invention is illustrated by the treatment of a dense stand of a commercial planting of cotton. The composition consisted of a 50% by weight dust of sodium ethyl xanthate ground with a commercial grade of calcined gypsum. This dust product was applied to the cotton by plane at the rate of 35 pounds per acre. Application was made at about the middle of October and one month after irrigation had been suspended. At this time, the plants were about 6 feet in height and a sprinkling of bolls on the lower branches had begun to open. A majority of the bolls on the plants were mature with relatively few flowers, square and bolls through the tops of the plants. A few hours after the application of the dust, the leaves began to wither. Within two weeks, the majority of the leaves had fallen, and those remaining were dried and shriveled. At this time, practically all of the mature bolls were opened. In a single picking more than 95% of the crop was collected.

In adjacent untreated plots observed as controls, the bolls underwent a progressive opening with little if any defoliation of the plants until early winter. In these fields, three pickings were required in order to obtain a yield of cotton comparable with that harvested from the dusted acreage.

More precisely, on one treated plot, 80.94% chemical defoliation was effected as against 25% natural defoliation on a check plot over the same period of ten days. Upon another plot, a 91.80% chemical defoliation was effected upon a treated plot as against a 44.36% natural defoliation of the untreated plot over the same period of ten days.

I have previously mentioned that the materials of this invention can be further adapted for use under arid conditions where heretofore no other materials used in the past have been successful, by including an anhydrous solid acid or acid salt. The acid or acid salts include citric acid, tartaric acid, oxalic acid, sodium acid sulfate, the various acid phosphate salts and the like, the acid or acid salt utilized being preferably one which is not hygroscopic, since this property provides packaging difficulties. However, in particularly arid regions, it may be desirable to use a hygroscopic acid or acid salt and to package the mixture in a container making atmospheric moisture access to the composition impossible prior to use. Other materials which can be used are mild oxidants of an acid nature such as ammonium persulfate. Various zinc salts such as zinc sulfate, zinc carbonate and zinc oxide can also be used to form a zinc xanthate on the plant which is white in color and thus obviate the yellow xanthate stain. Zinc sulfate reacts very quickly with the xanthate when in admixture therewith and such a mixture must be used very quickly after having been completed. For this reason, it is preferred to use zinc carbonate or zinc oxide to prevent the xanthate stain.

I claim:

1. A method for maturing cotton to cause the shedding of the leaves and the uniform opening of cotton bolls which includes the step of applying to the foliage of the cotton after the crop has been made sodium ethyl xanthate, the concentration and the amount of the latter being such as to exert an herbicidal action on the cotton leaf and not on the plant stems.

2. A method for maturing cotton to cause the shedding of the leaves and the uniform opening of cotton bolls which includes the step of applying to the foliage of the cotton, after the crop has been made, an alkali metal, saturated alkyl xanthate having from one to two carbon atoms in the alkyl group, the concentration and the amount of the latter being such as to exert a herbicidal action on the cotton leaf and not on the plant stems.

KENNETH L. ENGLUND.

REFERENCES CITED

The following references are of record in the file of this patent:

UNITED STATES PATENTS

| Number | Name | Date |
|---|---|---|
| 2,562,011 | Baumgartner | July 24, 1951 |

FOREIGN PATENTS

| Number | Country | Date |
|---|---|---|
| 15,777 | Great Britain | Nov. 21, 1912 |

OTHER REFERENCES

Science, Oct. 16, 1936, p. 356.